Jan. 25, 1955   W. W. FORTENBERRY   2,700,567
MAGNETIC IMPROVEMENT FOR JET JUNK BASKETS
Filed Aug. 20, 1953   2 Sheets-Sheet 1
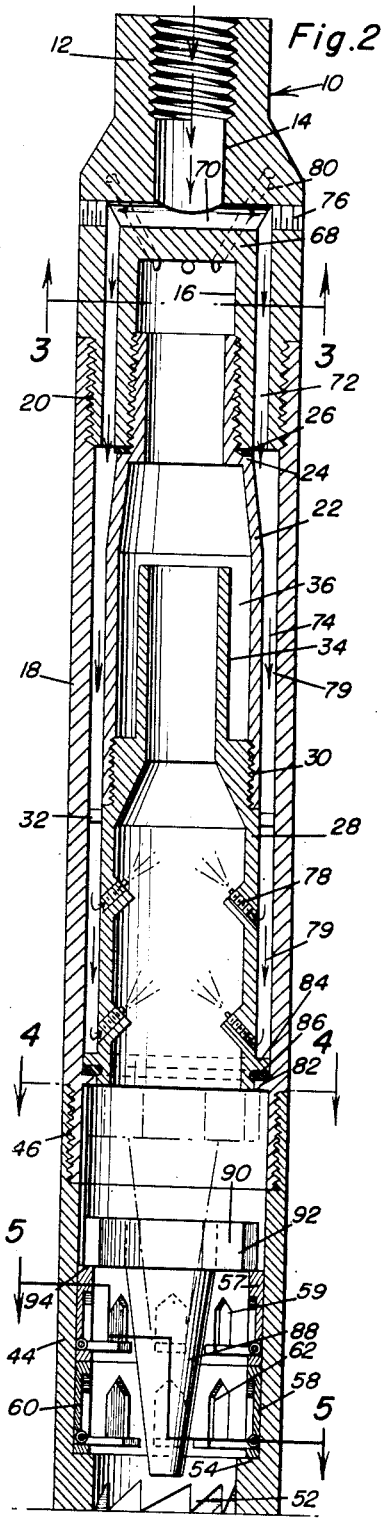
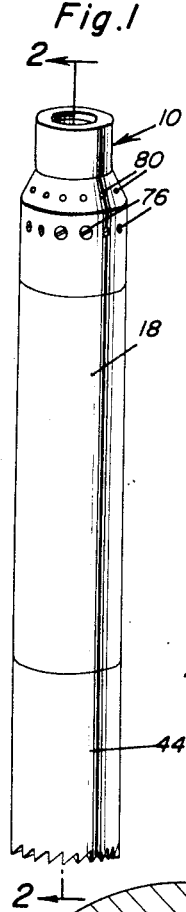
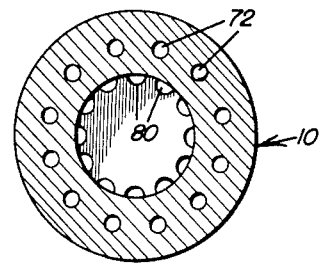
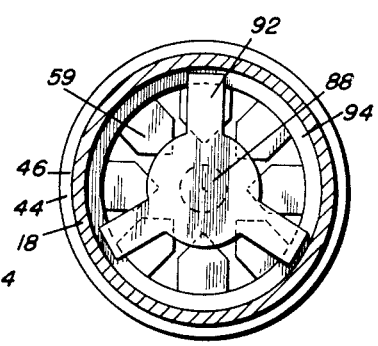
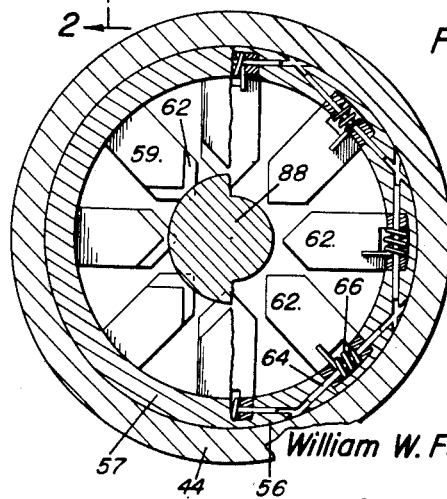
William W. Fortenberry
INVENTOR.

Jan. 25, 1955  W. W. FORTENBERRY  2,700,567
MAGNETIC IMPROVEMENT FOR JET JUNK BASKETS
Filed Aug. 20, 1953

William W. Fortenberry
INVENTOR.

United States Patent Office 2,700,567
Patented Jan. 25, 1955

2,700,567

MAGNETIC IMPROVEMENT FOR JET JUNK BASKETS

William W. Fortenberry, Odessa, Tex.

Application August 20, 1953, Serial No. 375,362

4 Claims. (Cl. 294—65.5)

This invention relates to jet junk baskets of the type as disclosed in Patent Number 2,645,290, issued July 14, 1953, for a junk basket, and more specifically to a magnetic improvement for retaining comparatively large-size pieces of debris thus permitting the junk basket to more effectively perform its functions.

The primary object of the present invention is to provide means for entrapping debris and retaining even comparatively large-size particles of magnetic material such as broken pieces of drilling tools and the like thereby permitting more effective utilization of well digging apparatus.

The construction of the present invention features the use of a magnetic core which may be incorporated in a junk basket of the type presently in use and which has been disclosed in Patent Number 2,645,290. This magnetic core attracts and holds comparatively large-size pieces of magnetic material. The core is substantially conical in shape so as to permit freedom of passage through entrapping fingers provided for holding other particles of debris from falling out of the junk basket.

The device may be utilized when it is necessary to break up comparatively hard packed debris by eliminating the central portion of the junk basket and utilizing only the sets of retaining fingers and the magnetic core to hold the debris in position. Thus, this structure is especially adaptable when going fishing for a single comparatively large piece of metallic debris.

Incorporated in this invention are sets of rotatable catching fingers utilized to hold debris in position, the catching fingers being designed to permit movement of the trunk core therethrough.

These, together with the various ancillary objects and features of the invention which will become apparent as the following description proceeds, are attained by this magnetic improvement for jet junk baskets, preferred embodiments being shown in the accompanying drawings, by way of example only, wherein:

Figure 1 is a perspective view of the jet junk basket incorporating the structure of the present invention;

Figure 2 is an enlarged vertical, sectional view as taken along the plane of line 2—2 in Figure 1, and showing the entire construction of the jet junk basket in greatest detail;

Figure 3 is a horizontal, sectional view as taken along the plane of line 3—3 in Figure 2;

Figure 4 is a horizontal, sectional view as taken along the plane of line 4—4 in Figure 2 and illustrating the construction of the flanges forming a part of the magnetic movable member;

Figure 5 is a sectional detail view as taken along the plane of line 5—5 in Figure 2 illustrating the construction of the attaching fingers and core;

Figure 6:
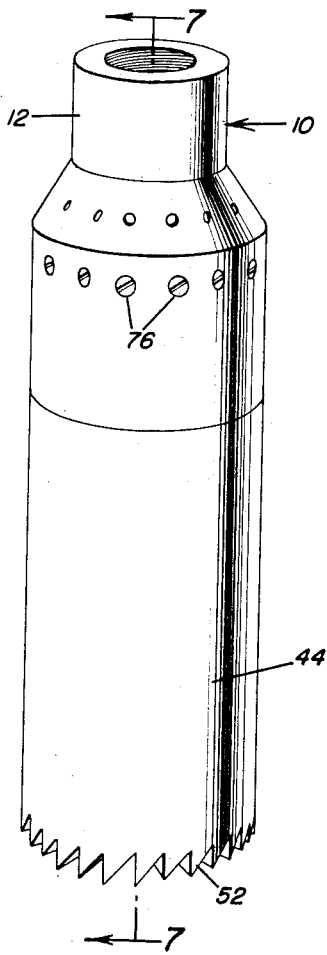
Figure 6 is a perspective view of an embodiment of the invention shown with the central body portion of the junk basket incorporating the high velocity jets removed therefrom.

With continuing reference to the accompanying drawings wherein like numerals designate similar parts throughout the various views, reference numeral 10 generally indicates an upper head which is substantially cylindrical and which is provided with a reduced upper portion 12. The head 10 has an axial bore 14 that is threaded for engagement with a drill stem or the like (not shown). The head 10 has a lower axial bore 16 that is threaded for a purpose to be set forth hereinafter. A hollow cylinder or bowl 18 is threadedly engaged upon the lower threaded end 20 of the head 10.

Received in spaced relationship within the bowl 18 and threadedly engaging the head 10 is an upper liner 22. The upper liner 22 is substantially of hollow cylindrical shape and is provided with a reduced upper end forming a shoulder 24 retaining packing 26 between the head 10 and the liner 22. The lower end of the upper liner 22 is internally threaded for engagement with a lower liner 28 as at 30. The lower liner 28 is received within the bowl 18 and it is provided with circumferentially spaced lugs 32 which space the liners 22 and 28 from the inside of the bowl 18. The liner 28 has an upwardly extending discharge tube 34 that extends into the upper liner 22 which is spaced from the inside wall thereof to define an annular well 36 therebetween.

A milling head 44 is threaded to the lower end of the bowl 18 as at 46. The lower end of the milling head 44 has an annular cutting surface formed by a plurality of projections or teeth 52. The head 44 is hollow and is counterbored to form a shoulder 54 upon which tubular members forming catchers 56 are rotatably received.

Figure 10:
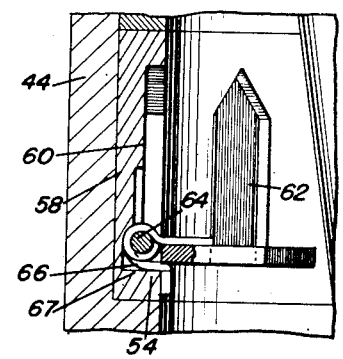
Figure 10 is an enlarged sectional detail view illustrating the construction of a catching finger.

The lower catcher 56 (see Figure 7) consists of a tubular sleeve 58 provided with an annular groove 60. A plurality of fingers 62 having preferably pointed ends are hinged to the sleeve 58 within the groove 60 by means of pins 64. The ends of the fingers 62 embrace the pins 64 and are slotted for the insertion of spring 66. As can be seen best in Figures 2, 5, and 10, the springs 66 urge the fingers to a horizontal position where they are prevented from any further downward movement by both the construction of the springs and by the shoulder 67 formed by the annular groove 60. It is to be noted that the finger 62 may be raised whereupon they may be received within the groove 60.

When one catcher 56 is used, it rests upon the shoulder 54 and if more than one is utilized they are placed to rest upon each other. The upper set of catchers as is indicated at 57 is provided with a set of catching fingers 59.

The head has a partition 68 between the bores 14 and 16 and is provided with a plurality of lateral bores 70, which with vertical bores 72 in the side of the head 10 communicate between the bore 14 and the space 74 inside the bowl 18 that surrounds the liners 22 and 28. The vertical bores 72 are preferably formed by drilling from the lower end of the head 10 and the passages are easily formed by drilling and closing the ends of the bores with threaded plugs 76. The space 74 communicates with the interior of the liner 28 through a plurality of upwardly directed inlet ports 78. Additionally, the bore 16 communicates with the outside of the assembly through the outlet passages 80. The passages 80 are spaced between the bores 70 and 72 and are preferably directed upwards and outwards through the partition 66 on the sides of the head 10.

It will be understood that through entering the bore 14 under pressure will pass through the bores 70 and 72 to the space between the bowl 18 and the liners 22 and 28, thence through the port 78 to the inside of the liner 28 as indicated by the flow arrows 79. The fluid will then proceed up the discharge tube 34 and finally out of the passages 80.

There is preferably a plurality of levels of inlet ports or jets 78, below the lowest of which is located adjacent the lower portion of the lower liner 28 so as to be adjacent the level of the upper catcher 57. The bowl 18 is provided with a flange 82 which cooperates with an annular flange 84 on the lower liner 28. A gasket 86 is positioned between the flanges 82 and 84 to insure a better seal therebetween. The effectiveness of the seal will prevent any loss of fluid pressure as applied upon the jets 78.

Any number of jets 78 may be utilized. These jets are provided to direct jetted streams of fluid for increased turbulence and impact effect upwardly.

A magnetic improvement to the jet junk basket includes the concept of providing a substantially truncated conical core 88 of a permanently magnetized material forming a permanent magnet and forming the main portion of a movable member generally indicated at 90; the core having flanges 92 attached thereto and extending outwardly therefrom. The flanges 92 are adapted to seat upon the shoulder 94 formed by the upper edge of the upper catcher or tubular member 57 when two tubular members are utilized. Obviously the flanges are of such size as to permit a maximum of fluid flow thereby while providing a comparatively stable seat for the movable member 90. It is to be noted that the flanges 92 also serve the purpose of spacing the core 88 from the side walls of the milling head 44 thereby permitting and insuring a substantially vertical movement by the movable member. The flanges 92 may be formed from a suitable non-magnetic material attached thereto by any suitable means such as braising or the like, or may be separately fastened in any suitable manner. In lieu of the use of the non-magnetic material for the flanges 92 or in addition thereto a sleeve of non-magnetic material (not shown) may be positioned within the milling head 44.

One of the important aspects of the invention resides in the fact that the core 88 can readily pass through the space between the fingers 62, the fingers 62 being of such size and shape as to define an opening somewhat larger than the space necessary for the reception of the core 88 when in its lowest position as is shown in the solid lines in Figure 2. It is to be noted that the fingers 59 may be formed of a substantially reduced size so as to permit passage of the thick portions of the upper part of the core 88.

In operation, after the junk basket has been lowered into the drilled hole as it approaches the junk that it is desired to remove fluid is introduced through the bore 14. This fluid will wash over or scour away small material that is caved in over the junk by virtue of the suction caused by the upwardly directed jets. As soon as the junk basket is substantially on the bottom of the hole, the drill stem can be rotated to cause the rotation of the junk basket and the comb teeth 52 so as to mow over and cut around and cause the milling head 44 to embrace the debris as the junk basket moves downward due to the drilling or cutting action. The material or debris will then move up through the fingers 57 and 62 to permit such advance. As soon as the magnetic core 88 encounters a piece of material responsive to the magnetic attractions thereof, such material will be securely held in position. The debris will then proceed up the levels of the inlet port 78 at which level the debris is subjected to the shutter air impact of the jet sub pressure drilling fluid. This tends to disperse clay, shale, soft sandstone and the like. These and other small pieces of debris are carried upward by the fluid velocity through the tube 34. Because of the increased flow pattern which results debris of large size will fall back into the annular well 36 due to reduced support therefore. It is noted that the magnetic moving member 90 is highly advantageous since hard objects as broken tools and the like will be resistant to the pulverizing action of the junk basket and will remain in a secure manner as held by the magnetic core 86 thus preventing such hard objects from damaging the fingers 59 and 62 or from becoming loose and falling back into the hole.

Figure 7:
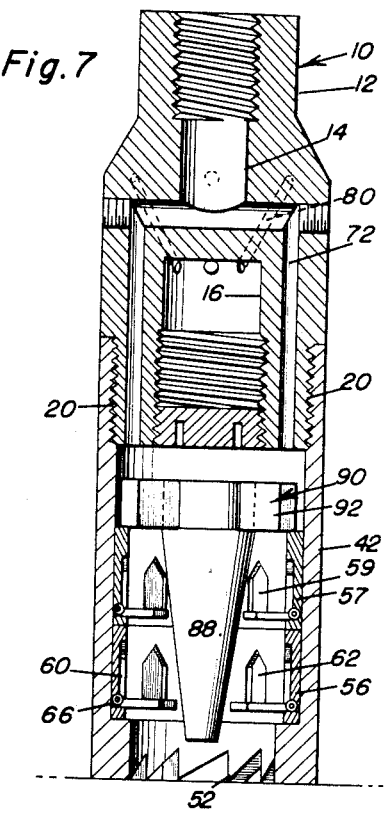
Figure 7 is a vertical, sectional view as taken along the plane of line 7—7 in Figure 6.
Figure 8:
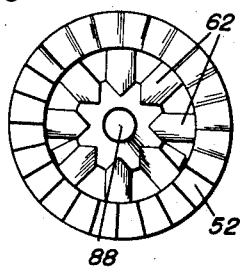
Figure 8 is a bottom plan view of the embodiment of the junk basket shown in Figure 6.
Figure 9:
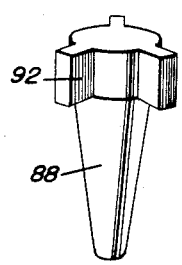
Figure 9 is a perspective view of the novel magnetic movable member.

When it is desired to fish for a single hard object such as a broken piece of tool or the like, the arrangement as is shown in Figures 6 and 7 can be utilized. Herein, the bowl 18 and its associated parts is removed and the head 10 screwed directly upon the milling head 44. Then, the upwardly directed jets 78 are not utilized but the washing action of the junk basket is intensified. The magnetic core 88 is, of course, utilized to magnetically attract and hold the material caught to be removed from the hole.

Since from the foregoing the construction and advantages of this magnetic improvement for jet junk baskets are readily apparent, further description is believed to be unnecessary.

However, since numerous modifications will readily occur to those skilled in the art, after a consideration of the foregoing specification and accompanying drawings, it is not intended to limit the invention to the precise embodiments shown and described, but all suitable modifications and equivalents may be resorted to.

What is claimed as new is as follows:

1. A junk basket for use on rotary drilling stems comprising a body having a chamber opening at the lower end, drill teeth on the lower end of said body, a catcher including a tubular member received in said chamber, a plurality of fingers each having one end thereof pivoted to said tubular member forming means for preventing passage of material downwardly therefrom, and a movable member positioned in said body, said movable member having a magnetic core and flanges outwardly extending from said core, said flanges being of greater size than the interior diameter of said tubular member whereby said tubular member provides a limit stop for downward movement of said movable member, said core being of substantially truncated conical shape, said fingers being of a size as to permit passage of at least part of said core therebetween, a second tubular member being positioned beneath said first recited tubular member, a second set of fingers attached to said second tubular member of larger size than said first recited plurality of fingers.

2. A junk basket for use on rotary drilling stems comprising a body having a chamber opening at the lower end, drill teeth on the lower end of said body, a catcher including a tubular member received in said chamber, a plurality of fingers each having one end thereof pivoted to said tubular member forming means for preventing passage of material downwardly therefrom, and a movable member positioned in said body, said movable member having a magnetic core and flanges outwardly extending from said core, said flanges being of greater size than the interior diameter of said tubular member whereby said tubular member provides a limit stop for downward movement of said movable member, said core being of substantially truncated conical shape, said fingers being of a size as to permit passage of at least part of said core therebetween, a second tubular member being positioned beneath said first recited tubular member, a second set of fingers attached to said second tubular member of larger size than said first recited plurality of fingers, and a sleeve of non-magnetic material in said body engageable by said flanges.

3. A junk basket for use on rotary drilling stems comprising a body having a chamber opening at the lower end, drill teeth on the lower end of said body, a catcher including a tubular member received in said chamber, a plurality of fingers each having one end thereof pivoted to said tubular member forming means for preventing passage of material downwardly therefrom, and a movable member positioned in said body, said movable member having a magnetic core and flanges outwardly extending from said core, said flanges being of greater size than the interior diameter of said tubular member whereby said tubular member provides a limit stop for downward movement of said movable member, said core being of substantially truncated conical shape, said fingers being of a size as to permit passage of at least part of said core therebetween, a second tubular member being positioned beneath said first recited tubular member, a second set of fingers attached to said second tubular member of larger size than said first recited plurality of fingers, said flanges being formed of a non-magnetic material.

4. A junk basket for use on rotary drilling stems comprising a body having a chamber opening at the lower end, drill teeth on the lower end of said body, a catcher including a tubular member received in said chamber, a plurality of fingers each having one end thereof pivoted to said tubular member forming means for preventing passage of material downwardly therefrom, and a movable member positioned in said body, said movable member having a magnetic core and flanges outwardly extending from said core, said flanges being of greater size than the interior diameter of said tubular member whereby said tubular member provides a limit stop for downward movement of said movable member, said core being of substantially truncated conical shape, said fingers being of a size as to permit passage of at least part of said core therebetween, a second tubular member being positioned beneath said first recited tubular member, a second set of fingers attached to said second tubular member of larger size than said first recited plurality of fingers, and a sleeve of non-magnetic material in said body engageable by said flanges, said flanges being formed of a non-magnetic material.

(References on following page)

References Cited in the file of this patent

UNITED STATES PATENTS

| | | |
|---|---|---|
| 1,374,834 | Dooley | Apr. 12, 1921 |
| 2,083,062 | Hampton | June 8, 1937 |
| 2,458,158 | Gilman | Jan. 4, 1949 |
| 2,493,992 | Murphy et al. | Jan. 10, 1950 |
| 2,525,950 | Schabarum | Oct. 17, 1950 |
| 2,660,468 | Cook | Nov. 24, 1953 |
| 2,668,077 | Kirby II | Feb. 2, 1954 |